Nov. 18, 1930. H. E. LARSEN 1,781,758
REFRIGERATOR
Filed June 30, 1927 2 Sheets-Sheet 1
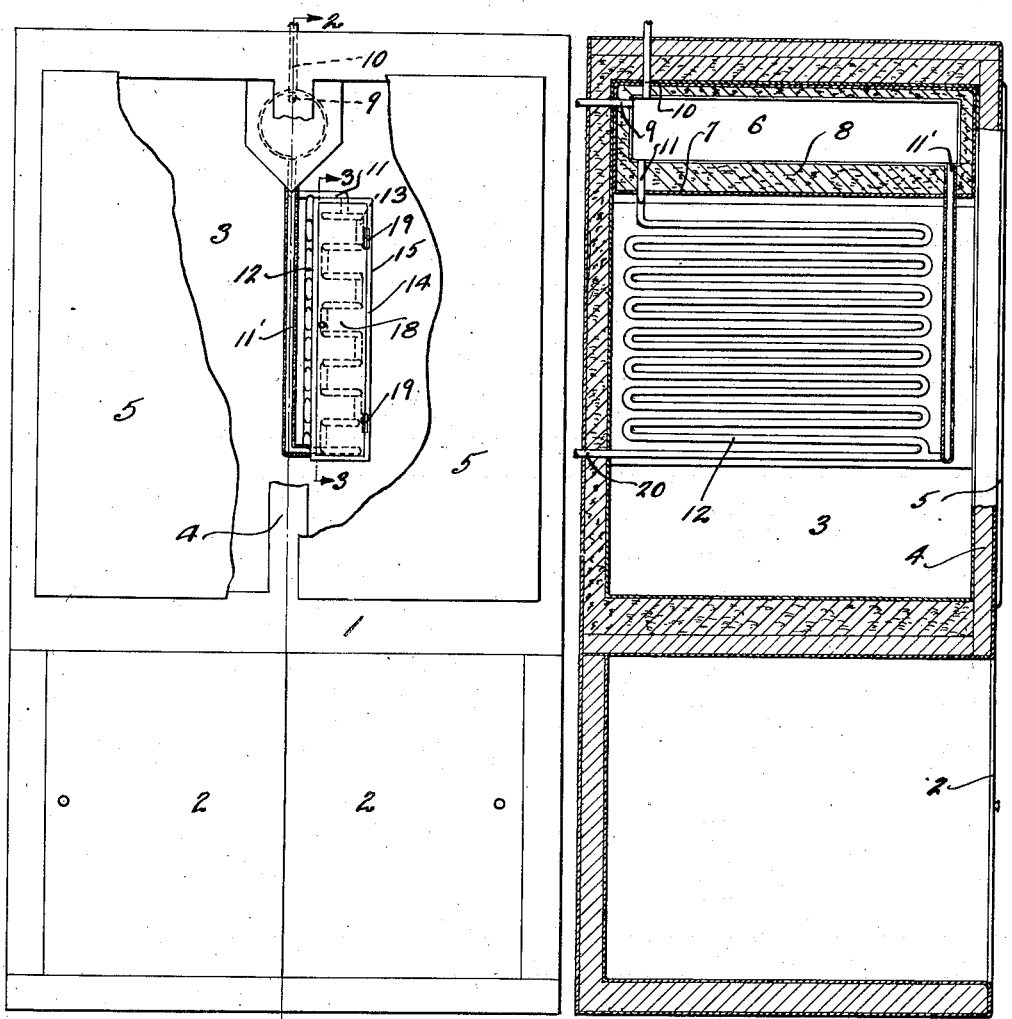
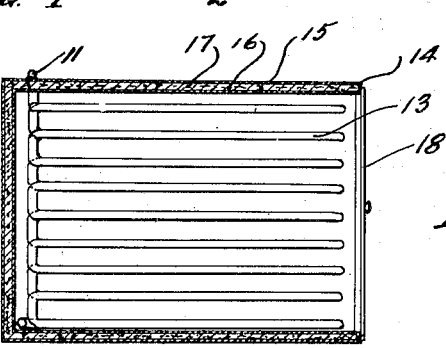
Inventor
Harry E. Larsen
By Brockett & Hyde
Attorneys Nov. 18, 1930.   H. E. LARSEN   1,781,758
REFRIGERATOR
Filed June 30, 1927   2 Sheets-Sheet 2
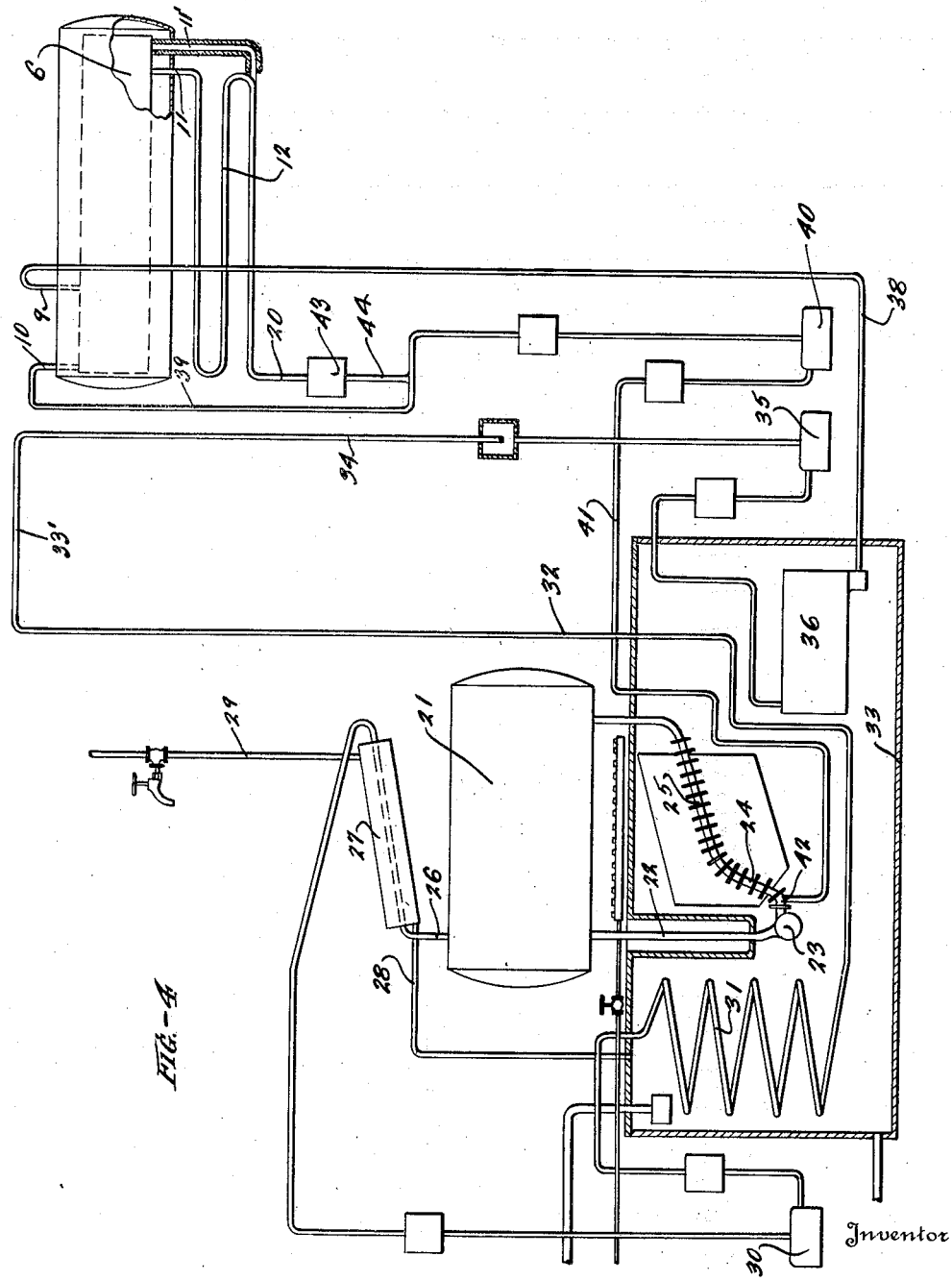
Inventor
Harry E. Larsen
By Brockett & Hyde
Attorneys Patented Nov. 18, 1930

1,781,758

UNITED STATES PATENT OFFICE

HARRY E. LARSEN, OF NEW YORK, N. Y., ASSIGNOR TO EDMUND E. ALLYNE, AS TRUSTEE FOR A SYNDICATE COMPOSED OF EDMUND E. ALLYNE, ROLLIN H. WHITE, AND HARRY E. LARSEN

REFRIGERATOR

Application filed June 30, 1927. Serial No. 202,559.

This invention relates to refrigerating apparatus.

In refrigerating apparatus generally the refrigeration chamber is equipped with an evaporator of some suitable type adapted by absorption of heat therein to produce the refrigerating operation. Heretofore some of these evaporators or cooling units have been arranged with coils for cooling the refrigerating chamber and suitable arrangements for freezing ice cubes. In some instances the ice cubes are formed in separate compartments not heat insulated to any great extent from the refrigerating compartment so that any change in temperature in the refrigerating chamber affects the ice cubes.

In view of the foregoing, the present invention therefore relates to a cooling unit or evaporator separated into two parts, one effective upon the refrigerating chamber of the ice box and the other effective within a separate heat insulated compartment within the main refrigerating chamber. This separate inner refrigerator, so to speak, may be utilized for freezing ice cubes or for producing a low temperature possibly lower at all times and in any event continued lower for a considerable period of time after a rise in temperature in the main refrigerating compartment. This inner refrigerator is also not materially affected by the opening of the main refrigerator door.

While this type of cooling unit or evaporator may be used in conjunction with any refrigerating system, it finds great utility when used in conjunction with refrigerating apparatus of the absorption type where heating and cooling are used in the production of the cycle. When used in conjunction with a system of this type the cooling unit or evaporator comprises a heat insulated storage tank connected in liquid gravitating communication with cooling elements or coils arranged in the refrigerating chamber, a very unique improved arrangement of these elements or coils being where one coil is arranged in the main refrigerating chamber and another arranged in another or inner heat insulated compartment or refrigerating chamber separate and apart from the main chamber. In this instance both coils are preferably connected in parallel with this storage tank so that they operate independently.

Any suitable absorption cycle producing apparatus may be employed, but I find a suitable one to be an arrangement including a boiler absorber having its gas space connected through a rectifier and through a trap to the top of a condenser, thence from the bottom of the condenser through a relatively high loop and through a trap to the top of a receiver. From the bottom of the receiver the circuit then leads to the storage tank of the evaporator where any liquid ammonia gas may gravitate to the cooling elements or coils. This storage tank has its top also connected by a return expanded gas line to a cooling loop arranged in circulatory communication with the bottom of the boiler. A trap is placed in this line to prevent flow from the boiler to the evaporator during heating. All of the other traps referred to, except the one in the gas return to the loop, prevent flow toward the boiler but permit free flow toward the evaporator from the boiler.

Other features of the invention will be brought out in the specific embodiment set forth in the following description, drawings and claims.

In the drawings, Fig. 1 is a front elevation of an icebox with a portion of the front and doors broken away to expose the inner parts; Fig. 2 is a vertical section from front to back; Fig. 3 is a detail vertical section of the inner refrigerator; and Fig. 4 is a diagrammatic illustration of an absorption circuit.

In the arrangement shown in the drawings, 1 represents a suitable box provided with cupboard space closed by doors 2 and an upper refrigerating chamber 3 provided with a central door strip 4 and doors 5. The refrigerating chamber is insulated in any suitable manner in accordance with effective icebox construction practice. Within the refrigerating chamber is the evaporator, comprising a storage tank 6 preferably arranged in a casing 7 of larger size for containing a suitable insulating medium 8. This storage tank is adapted to receive the charge of liquefied ammonia when delivered to it from the refrigerating plant. One arrangement will be provided with a suitable liquid refrigerant inlet pipe 9, a refrigerant return pipe 10 and a liquid refrigerant discharge pipe 11 at the bottom, communicating with a main refrigerating chamber cooling coil or grid 12 and with an inner refrigerator coil 13. Both of these coils are connected in parallel to the pipe 11 leading to the bottom of the storage tank 6. Another pipe 11′ leads from the bottom of the tank 6 to the bottom of the coils 12 and 13 and it is heat insulated to prevent boiling therein and to insure a proper supply of liquid refrigerant to these coils. The coil 13 is arranged within an inner refrigerator casing 14 shown as being of narrow form and including suitable inner and outer casings 15 and 16 providing a space for insulation 17. All walls are formed in substantially one unit and are heat insulated. A suitable door 18 of like construction is hinged at 19 to this inner refrigerator casing and is adapted to complete this separate or inner refrigerator within the outer refrigerator chamber 3. The hinges 19 are preferably of any well-known spring hinge type so that the door 18 is held tightly closed.

Both of these coils 12 and 13 are connected with the absorption plant, as will be later shown. To return any boiler liquor which may happen to flow over during the operation of the apparatus a pipe 20 is provided.

From the foregoing it will be seen that the liquid refrigerant will gravitate from the tank 6 into both of the coils 12 and 13 where it will absorb the heat and pass off as gas through the pipe 10. Most absorption systems are provided with some suitable control, in some instances automatic, and irrespective of the type used the operation of the evaporator will be readily understood from the following. If the tank and both evaporator coils 12 and 13 should be completely exhausted by a refrigerating operation or cycle, then the supply of liquid refrigerant from the absorption apparatus on the next heat will result in the gravitation of only a small quantity of warm liquid refrigerant into the coils just enough to fill the coils and the volume of this warm liquid is so small that it will produce little rise of temperature in either the inner or the outer refrigerating chambers. Indeed, it would be insufficient to even cause any noticeable melting of ice cubes when located at this particular time in the inner refrigerating chamber. The condition just mentioned is obviously the most trying one. If the heating period is started when the coils 12 and 13 are partly or entirely filled with refrigerant, then less or none of the hot refrigerant is delivered to these coils and the undesirable heating of the box is therefore diminished. It is quite obvious that by having a storage tank suitably insulated from the refrigerating chamber and from the outside undue heating on the one hand and loss of cooling effect on the other are avoided.

A suitable circuit for use with an evaporator of this type is illustrated in Fig. 4. It comprises the boiler absorber 21 provided with a cooling loop including the vertical hot leg 22, the lower bend 23, the more vertical portion 24 of the cold leg and the more horizontal leg 25 which extends up and is in communication with the bottom of the boiler. It is obvious that the boiler liquor passes down into this loop and fills it. Connected to the gas space or to the top of boiler is a gas outlet tube 26 provided with a water cooling jacket 27 and a water inlet 28, and a water discharge 29. This gas pipe 26 is provided with a trap 30 between it and a condenser 31. This trap may be a mercury seal or any useable device for preventing flow from the condenser to the boiler but permitting free flow from the boiler to the condenser. The pipe 26 passes into the top of the condenser and the bottom of the condenser is connected to a relatively long vertical pipe 32. The condenser and the vertical portion 24 and the more horizontal portion 25 of the loop are all immersed in water in a suitable container 33. The pipe 32 is provided in the top bend 33′ and with a down leg 34 leading to a trap 35 similar in all respects to the trap 30. The discharge from this trap is to a receiver 36 arranged in the water tank 33. The discharge from the condenser into the receiver is at the top thereof and the discharge from the receiver is through a pipe 38 which leads up to and is connected with the pipe 9 leading to the storage tank 6. The pipe 10 from the tank 6 leads downward through a line 39 to a trap 40 similar to the traps 30 and 35 and the outlet from this trap leads through a pipe 41 to a point 42 at the base of the more vertical portion 24 of the loop 22.

In order to convey back to the boiler-absorber any refrigerating agent which may have gone over to the evaporator during the heating period the bottom of the pipe 20 is connected to another trap 43 of any preferred type which will sustain a suitable column of refrigerant in the evaporator to pass back to the boiler through a pipe 44 connected into the line 39.

Assuming that the absorption apparatus includes a suitable automatic control, not shown, but of any type, and assuming that the boiler is filled with aqua-ammonia and that the heating cycle is just starting for the first time, the ammonia gas passes off through the rectifier through the trap 30 to the condenser 31. Here the gas is condensed until the condensing capacity of the condenser is so reduced, with respect to the gas producing capacity of the boiler, that the boiler pressure forces the liquid ammonia over into the receiver 36 through the trap 35. The condenser again proceeds to condense gas coming over from the boiler and this operation is repeated until substantially all of the gas content of the liquor in the boiler is in liquid gas form in the receiver. The end of the heating cycle has then been reached and the control must be operated either by hand or automatically to turn off the heat and permit the cooling cycle to function. At the end of the heating period the condenser is the only part of the apparatus which is functioning as before, so it continues to condense whatever gas is contained in it and whatever gas may flow over from the boiler. This operation by the condenser of drawing gas from the boiler results in the boiler becoming an area of low pressure, as between it and the evaporator, so that a relief of pressure from the evaporator to the boiler causes the gas in the receiver to expand and force its charge up into the storage tank of the receiver where it passes down into the coils 12 and 13 if they be empty. In time, by the continuance of condensation in the condenser and the natural contraction of the boiler, due to cooling, gas is caused to flow from the evaporator through the pipe 39, trap 40, pipe 41 to the bottom of the more vertical portion of the cold leg of the loop 22, when the gas will tend to produce a circulation of boiler liquor in the loop and hence the cooling thereof. This operation increases in intensity and continues throughout the entire cooling cycle. It is obvious from the foregoing that when the anhydrous ammonia is delivered to the evaporator tank 6 from the receiver, even though it may be warm, it will not greatly affect the temperature of the main refrigerating chamber or the inner refrigerator, because only small quantities flow into these parts even when they have been previously completely exhausted.

Having described my invention I claim:

1. The combination of a refrigerator having heat insulated outer and inner refrigerating compartments and refrigerating apparatus therefor comprising a heat-insulated refrigerant storage tank within said outer compartment and evaporator elements in parallel gravitating communication with said storage tank and located in said outer and inner refrigerating compartments.

2. A refrigerator as in claim 1 and a conduit leading from the bottom of said storage tank to the lower ends of said evaporator elements.

3. A refrigerator as in claim 1 and a heat-insulated conduit leading from the bottom of said storage tank to the lower ends of said evaporator elements.

4. A refrigerator as in claim 1 wherein both compartments are provided with heat-insulated doors.

In testimony whereof I hereby affix my signature.

HARRY E. LARSEN.